United States Patent
Isaac-Lowry

(10) Patent No.: US 9,955,108 B2
(45) Date of Patent: *Apr. 24, 2018

(54) MINIATURE HIGH DEFINITION CAMERA FOR VISIBLE, INFRARED, AND LOW LIGHT APPLICATIONS

(71) Applicant: O. Jacob Isaac-Lowry, Lexington, KY (US)

(72) Inventor: O. Jacob Isaac-Lowry, Lexington, KY (US)

(73) Assignee: IL Holdings, LLC, Lexington, KY (US)

( * ) Notice: Subject to any disclaimer, the term of this patent is extended or adjusted under 35 U.S.C. 154(b) by 214 days.

This patent is subject to a terminal disclaimer.

(21) Appl. No.: 14/514,673

(22) Filed: Oct. 15, 2014

(65) Prior Publication Data

US 2016/0112611 A1    Apr. 21, 2016

(51) Int. Cl.
| | |
|---|---|
| *H04N 5/77* | (2006.01) |
| *H04N 7/015* | (2006.01) |
| *H04N 7/10* | (2006.01) |
| *H04N 5/225* | (2006.01) |
| *H04N 7/04* | (2006.01) |
| *H04N 5/92* | (2006.01) |

(52) U.S. Cl.
CPC ............ *H04N 5/77* (2013.01); *H04N 5/2251* (2013.01); *H04N 5/2252* (2013.01); *H04N 5/2253* (2013.01); *H04N 5/2254* (2013.01); *H04N 5/2257* (2013.01); *H04N 5/92* (2013.01); *H04N 7/015* (2013.01); *H04N 7/04* (2013.01); *H04N 7/10* (2013.01); *H04N 7/102* (2013.01)

(58) Field of Classification Search
CPC ........................................ H04N 5/2251–5/2259
See application file for complete search history.

(56) References Cited

U.S. PATENT DOCUMENTS

| | | | | |
|---|---|---|---|---|
| 6,493,136 | B2 * | 12/2002 | Chang | G02B 7/002 351/158 |
| 2001/0038491 | A1 * | 11/2001 | Fergason | G02B 27/2228 359/466 |
| 2005/0174470 | A1 * | 8/2005 | Yamasaki | G02B 27/017 348/345 |
| 2008/0247744 | A1 * | 10/2008 | Une | G03B 17/24 396/310 |
| 2010/0289914 | A1 * | 11/2010 | Shinomiya | H04N 1/00347 348/222.1 |
| 2011/0059628 | A1 * | 3/2011 | Chen | H01R 27/02 439/61 |
| 2012/0188450 | A1 * | 7/2012 | Lynn | H04B 1/3805 348/552 |
| 2013/0155244 | A1 * | 6/2013 | O'Rourke | H04N 7/185 348/158 |

(Continued)

*Primary Examiner* — Christopher K Peterson
(74) *Attorney, Agent, or Firm* — Francis Law Firm, PLLC; James M. Francis

(57) ABSTRACT

A miniature high definition camera system which converts parallel data to serial data at the camera and then back to parallel data at a remote digital video recorder to avoid signal attenuation issues known to occur with parallel data transmitted across data cables. The camera system features video sensors to permit recording in visible, infrared, and ultraviolet wavelengths as well as in low light for night vision.

22 Claims, 8 Drawing Sheets

(56) References Cited

U.S. PATENT DOCUMENTS

| | | | |
|---|---|---|---|
| 2014/0013024 A1* | 1/2014 | Lamm | H01R 27/02 710/313 |
| 2014/0092299 A1* | 4/2014 | Phillips | H04N 5/2251 348/376 |
| 2014/0249368 A1* | 9/2014 | Hu | H04N 5/2253 600/109 |

* cited by examiner

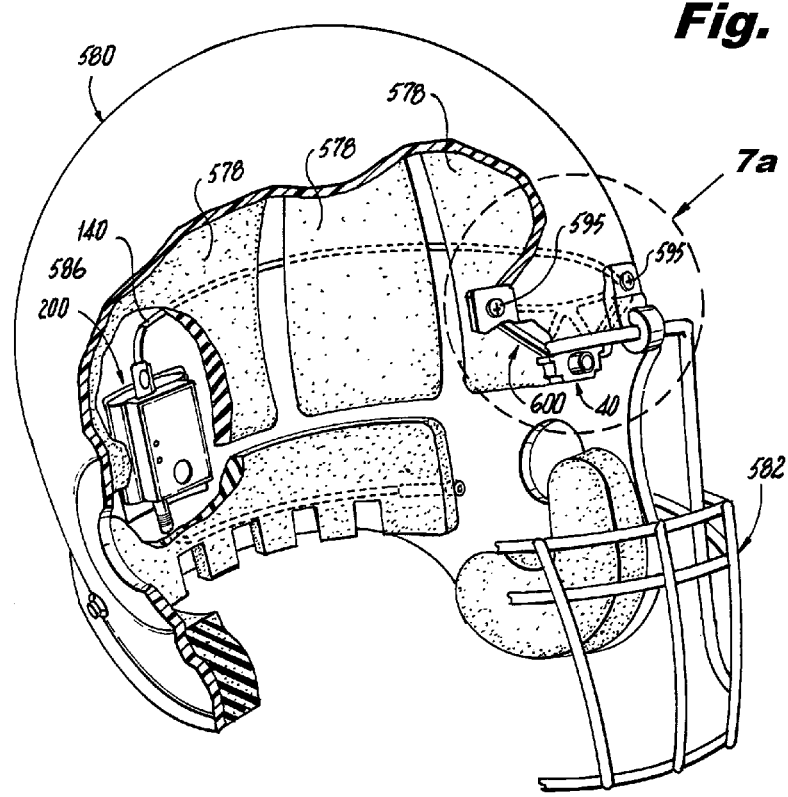
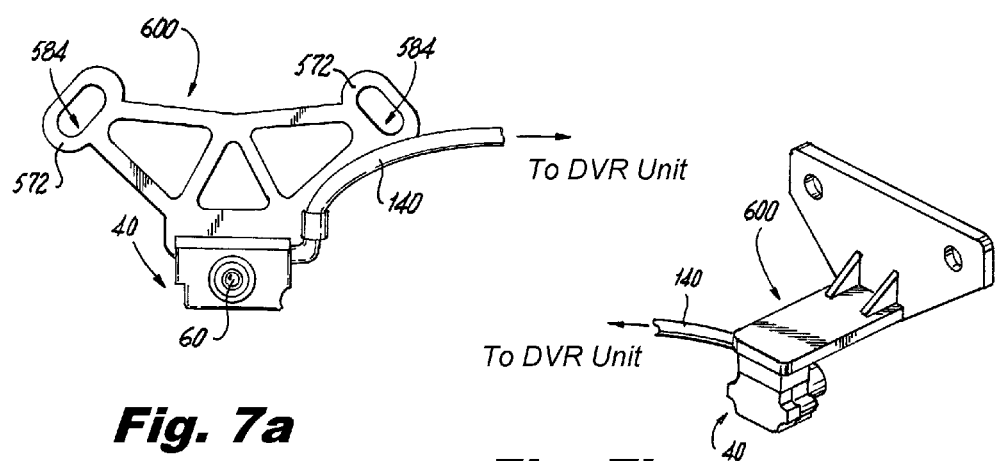
Fig. 7
Fig. 7a
Fig. 7b

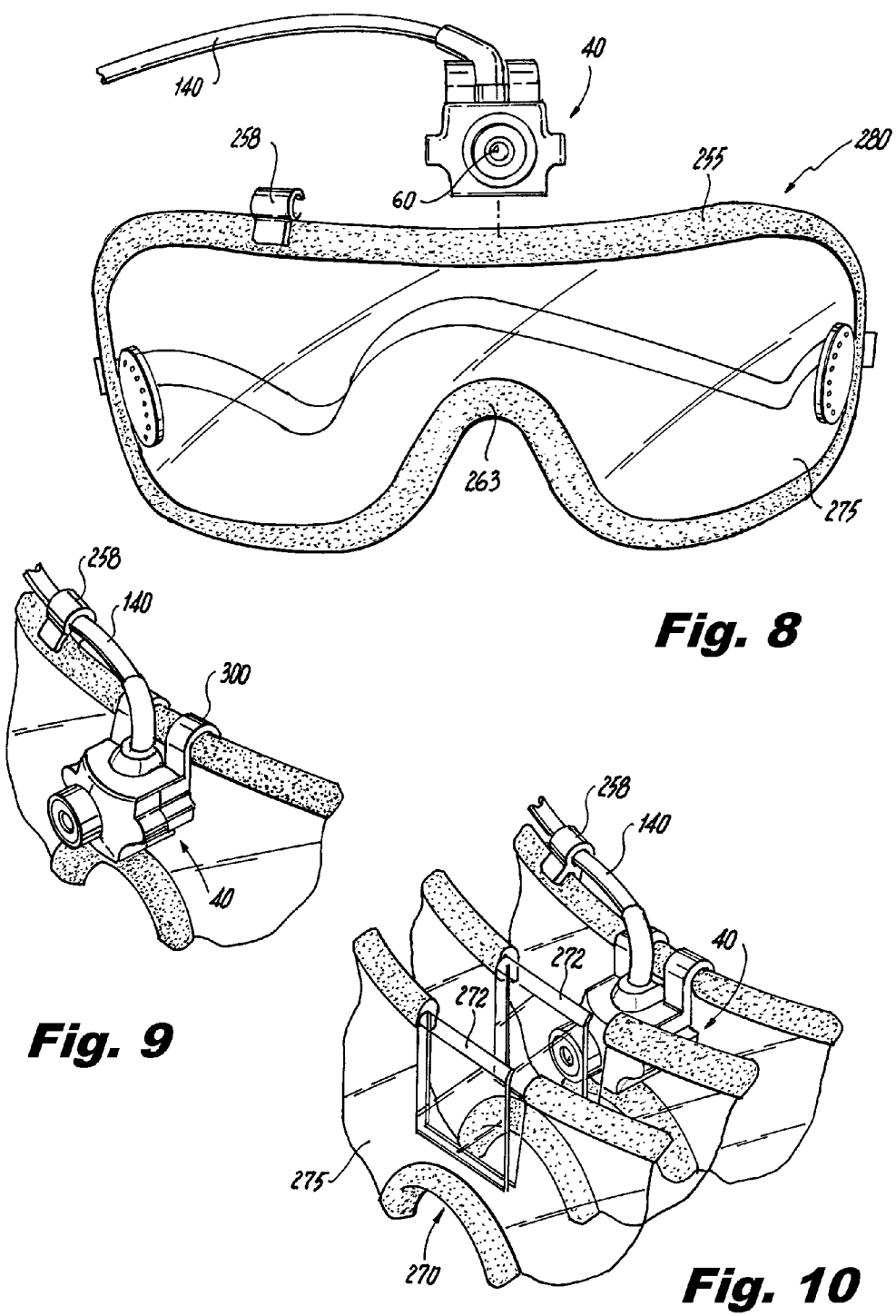

MINIATURE HIGH DEFINITION CAMERA FOR VISIBLE, INFRARED, AND LOW LIGHT APPLICATIONS

CROSS REFERENCE TO RELATED APPLICATIONS

This application claims the benefit of U.S. Provisional Patent Application 61/890,873 filed on Oct. 15, 2013 and is a continuation-in-part of co-pending U.S. Utility patent application Ser. No. 14/178,256 filed on Feb. 11, 2014.

TECHNICAL FIELD

The device of the present application relates generally to wearable audio-visual electronics. More specifically, the device of the present application relates to a device and method which permits greater miniaturization of the camera while permitting the recording of high definition video.

BACKGROUND

Digital cameras have undergone increasing miniaturization and they have enabled an increasing variety of opportunities for low-resolution hands-free photography and videography. Digital videography has been furthered by the use of improved data compression, higher bandwidth dual purpose cables and better audio-video interfaces, e.g. DVI, HDMI, IEEE 1394, and DisplayPort. However, the transfer of increasingly higher-definition video requires a greater bitrate than conventional coaxial cable can provide because of the use of significantly more pixels per image and a higher frame rate. The ability to transfer large amounts of data at high speeds has been a limiting factor to the use of miniature cameras since data storage must be remote from the camera to achieve the smallest configurations. Signal attenuation is also a significant barrier which limits the effective length of the audio-video cable.

HDMI cable can be manufactured to Category 1 specifications easily and inexpensively by using 28 AWG conductors which have diameters of 0.0126 in, i.e. 0.321 mm. Higher quality HDMI cables can be manufactured to Category 2 specifications and utilize 24 AWG conductors which have diameters of 0.0201 in, i.e. 0.511 mm. Several versions of the HDMI specification have been released with HDMI 2.0 being the most recently released version. HDMI versions 1.3 and 1.4 are much more common.

The effective length of an audio-video cable is limited by the bandwidth of the cable and signal attenuation. When an audio-video cable is used to transfer data in real-time with no buffer at the camera the effective length is reduced even further.

SUMMARY

The present application discloses a miniature digital camera system using a HDMI audio-video cable to transfer video data as it is collected to an audio-visual data recording device, i.e. DVR (digital video recorder) tethered to the end of a data cable. The digital camera collects high-definition (HD) video and feeds it directly to a DVR in real-time. Normally, the HDMI audio-video cable would not be able to provide the throughput needed at a cable length in excess of a few centimeters due to signal attenuation. While the application predominantly discussed throughout this disclosure relates to HD video recording, nothing in this disclosure should be read as limiting the data collected to video within the spectrum visible to humans as it is anticipated that data of interest at other wavelengths, e.g. infrared, ultraviolet, ultrasound, etc. . . . , could also be recorded in addition to specific wavelengths, processed signals, and low light visualization.

A method of data conversion is disclosed herein which enables increased HDMI tether length of the audio-visual cable for placement of the DVR several feet from the digital camera. A method of connecting the HDMI audio-visual cable to the printed circuit board of the digital camera so as to minimize the camera size is also described.

Various embodiments of miniature camera housings and mounting means are described herein which facilitate the use of the miniature camera system in various applications for broadcast and training, e.g. horse racing, football, and hunting.

A lens protection system and method for use which maintains the lens in a substantially clean state so as to not allow dirt and other environmental contaminants to interfere with the image to be recorded is also described herein. In a preferred embodiment of the system, a plurality of removable transparent lens covers are arranged to cover a camera lens. A further embodiment is described which permits recording video from the perspective of a jockey. A still further embodiment is disclosed which relates to wirelessly transmitting the video and/or audio recorded.

BRIEF DESCRIPTION OF THE DRAWINGS

FIG. 7 depicts a cutaway perspective view of an embodiment of the camera system and mini-DVR as installed within a football helmet.

FIG. 7a depicts a perspective view of an embodiment of a camera mount.

FIG. 7b depicts a perspective view of an embodiment of a camera mount.

FIG. 8 depicts an perspective view of an embodiment of the camera system and jockey goggles.

FIG. 9 depicts a perspective partial view of an embodiment of the camera system mounted onto jockey goggles.

FIG. 10 depicts a perspective partial view of an embodiment of the camera system as used with progressively nested jockey goggles.

DETAILED DESCRIPTION OF THE PREFERRED EMBODIMENTS

Figure 1:
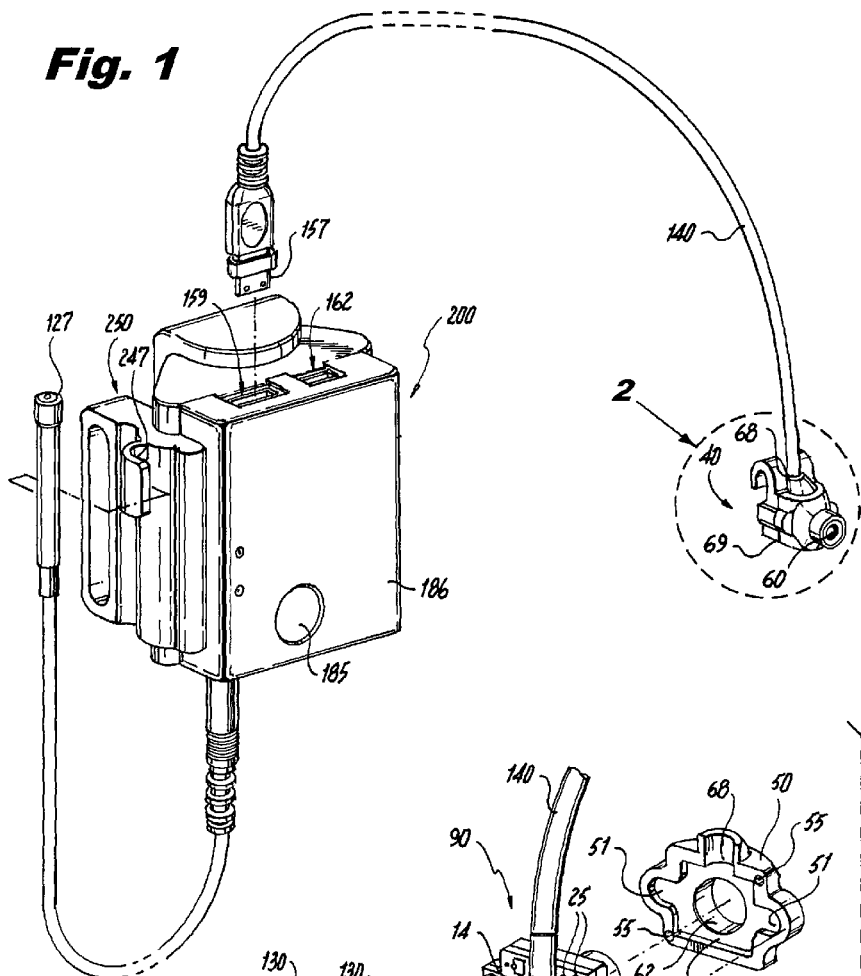
FIG. 1 depicts an embodiment of the subject camera system with data cable and remote mini-DVR.
Figure 2:
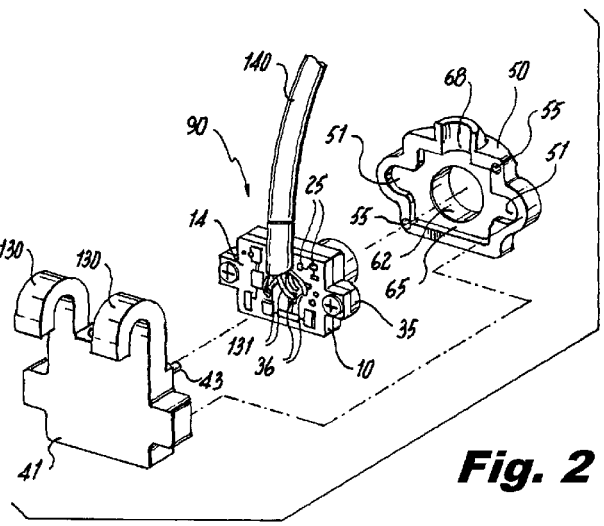
FIG. 2 depicts an exploded perspective view of an embodiment of the subject camera system.

A high definition miniature camera system 100 is disclosed herein in accordance with FIG. 1. A miniature camera 90 as depicted in FIG. 2 is further disclosed herein. This assembly incorporates a video sensor 18 integrated onto a camera PCB 10, i.e. printed circuit board, preferably a circuit board capable of supporting high speed serial communication lines. The PCB 10 is affixed within a lens housing 35 having a lens 60 or lenses 60 which is affixed over the video sensor 18. The PCB 10 is received within the lens housing 35. In a preferred embodiment, the lens housing 35 is a planar panel having a distal lens support surface 32 and a proximal lens support surface 34 from which the lens housing 35 extends in a substantially perpendicular orientation to the proximal lens support surface 34. The lens housing 35 is affixed to the PCB 10 across the distal lens support surface 32 with the video sensor 18 oriented toward the distal lens support surface 32 with the lens housing 35 substantially centered above the video sensor 18.

As depicted in FIG. 2, the PCB 10 and lens housing 35 combine to form the camera module 40 and are contained within a camera module housing 70. The camera module housing 70 is preferably constructed from at least two parts which assemble together to encase and secure the PCB 10 and lens housing 35. The proximal camera module casing 50 preferably possesses, in part, the lens housing 35, dowel receptacles 55, lens housing port 62 and proximal camera module recess 51 into which the lens housing 35 with the installed PCB 10 are received. The distal camera module casing 41 preferably possesses, in part, the distal camera module recess 47 and dowels 43. To assemble, the camera module 40 is inserted into the proximal camera module recess 51 in the proximal camera module casing interior surface 53 with the lens housing 35 received into the lens housing port 62.

Mobile phone and smart device camera and microphone technology is believed to be suitably small and be sufficiently power efficient to be of use in this configuration, however, in a preferred embodiment, a high definition video sensor 18 equipped with wide angle lens 60 having a resolution of at least 3 megapixels, more preferably at least 4 megapixels, and most preferably at least 5 megapixels is integrated onto the PCB 10 beneath the lens housing 35.

The distal camera module casing 40, as depicted in FIG. 2, is aligned with and affixed to the proximal camera module casing 50 by alignment means 43, e.g. dowels 43. The camera module housing 70 may be further sealed with the application of an adhesive along the camera module housing 70 joint 66. A preferred embodiment of the alignment means 43 utilizes dowels 43 protruding from the of the distal camera module casing 40. The dowels 43 of the distal camera module casing 40 are received into dowel receptacles 55 within the proximal camera module casing 50 so as to join the proximal and distal camera module casings 32, 40. The proximal and distal camera module casings 32, 40 are secured in their joined orientation and sealed. In a further preferred embodiment, the lens 60 is seated against the lens housing 35 to inhibit the introduction of moisture and contaminants into the camera 90. In a further embodiment, a seal 66 is placed between the lens 60 and lens housing 35 to further weatherproof the camera 90. In an alternative embodiment, the lens housing 35 possesses an interior annular groove 65 about the lens housing interior surface 67 to further improve the weather resistance of the camera 90 by inhibiting the introduction of water and environmental contaminants into the camera module housing 70.

The camera module housing 70 casings 32, 40 are preferably constructed of plastic, preferably molded from a deformable material such as a thermoplastic, e.g. acrylonitrile butadiene styrene (ABS). The casings 32, 40 may be created from a mold or from a three dimensional printer. Plastic is a preferred material due to the cost of materials and manufacturing as well as its low mass and rigid nature. The camera module housing 70 may further possess a camera mounting means 130 to facilitate the placement and affixation of the camera 90 to a desired location. The camera mounting means 130 may be affixed to the camera module housing 70 or it may be integrated into one or more camera housing casings 32, 40. Non-limiting examples of camera mounting means 130 include tensioned clips, mounting arms with hardware attachment means (e.g. screws) receiving holes, and ring clamps.

As depicted in FIG. 1, in a preferred embodiment, an audio-visual cable 140 is used to transfer data from the camera PCB 10 to a remote audio-visual data recording device 200, i.e. data storage device 200, e.g. a DVR 200. A HD video sensor 18 on the PCB 10 converts images obtained through the lens 60 into data which are associated with specific pixels on each captured image frame. Since the stream of video data is continuous, discrete frames are captured sequentially at a rate measured in frames per second, i.e. fps. Each pixel contains data, therefore the greater the resolution and the greater the number of pixels, the greater the amount of data collected and transferred. Additionally, the greater the image fps, the greater the number of frames are recorded and therefore an increasingly greater amount of data is collected and transferred. The data from the video sensor 18 is transmitted in a parallel communications protocol. Protocols for parallel transmission, such as those used for computer ports, have been standardized by ANSI.

Parallel communications protocol is a method of conveying multiple binary digits, i.e. bits, simultaneously. It contrasts with serial communication protocol, which conveys only a single bit at a time. Interference between parallel lines, i.e. crosstalk worsens with increasingly longer lengths required for the parallel communication link along the audio-visual cable 140. Crosstalk, e.g. undesired capacitive, inductive, or conductive coupling, is a phenomenon by which a signal transmitted on one channel creates an undesired effect in another channel. The ratio of the power in a disturbing channel or circuit to the induced power in the disturbed channel circuit is crosstalk coupling and is expressed in units of dB when describing crosstalk coupling loss, i.e. signal loss. This restricts the effective length of a parallel data connection for use with this application to about 3 centimeters when a meter or more is typically necessary to remove the media recorder 200 from the immediate vicinity of the camera 90.

Figure 6:
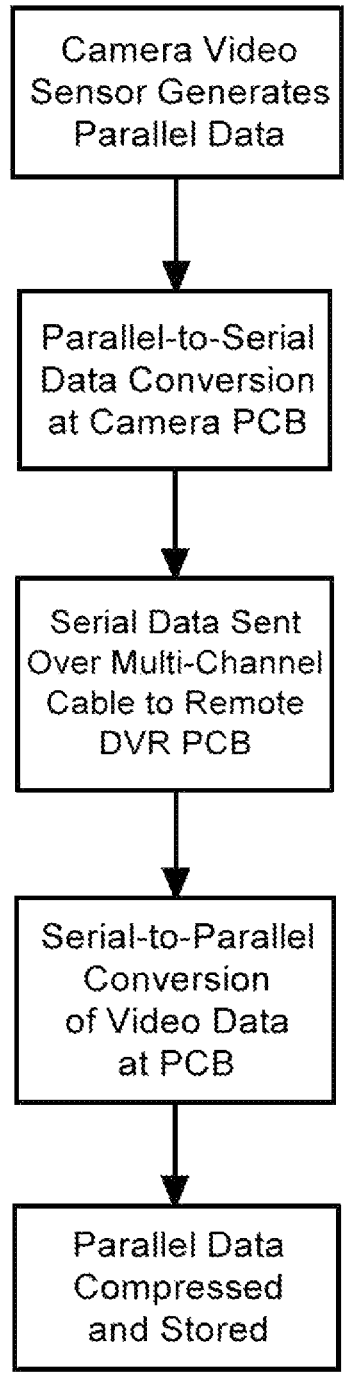
FIG. 6 is a flowchart depicting the method of video data serialization and remote deserialization.

To avoid the significant signal interference and/or signal loss encountered while transmitting parallel communications data, the parallel data is converted, as described in FIG. 6, to serial data by integrated circuitry 37 affixed to the camera PCB 10. The integrated circuitry 37, e.g. a microcontroller, microprocessor, or functional equivalent, may be separate componentry affixed to the camera PCB 10 or may be the video sensor 18. Parallel-to-serial conversion converts a stream of multiple data elements, received simultaneously, into a stream of data elements transmitted in time sequence, i.e. one at a time. Recent improvements in serial communications have resulted in serial computer buses becoming more common as improved signal integrity, transmission speeds, and simplicity have begun to outweigh its disadvantages relative to parallel communications, e.g. speed, clock skew, and interconnect density.

As depicted in FIG. 2, in order to transmit significant amounts of video data to a remote media recorder 90, a standard mini-HDMI cable 140 is repurposed and the conductors 131 therein are used as separate low voltage differential serial communication lines to obtain the necessary throughput without sacrificing the signal. The serialized data can be transmitted over a repurposed mini-HDMI cable 140 for at least 54 in, 1.3716 m, without significant signal interference or loss. Video sensors 18 with higher resolution capacity require an audio-visual cable 140 with more conductors 131 to transmit the data at a sufficient bitrate to capture all of the data.

In a preferred embodiment, a CMOS, i.e. a complementary metal-oxide-semiconductor, imaging chip is utilized as the video sensor 18 on the PCB 10. CMOS is a type of active pixel sensor made using the CMOS semiconductor process. The video sensor 18 converts the received light energy to a voltage. In a CMOS video sensor 18, each pixel has its own charge-to-voltage conversion, and the sensor 15 often also includes amplifiers, noise correction, and digitization circuits, so that chip outputs are digital bits.

In a further preferred embodiment, a 5 megapixel (MP) CMOS sensor 15 with a dynamic range of about 70 dB is integrated with the PCB 10 to provide responsivity of less than 2 microvolts/lux-s. Dynamic range is the ratio of a pixel's saturation level to its signal threshold. Responsivity is the amount of signal the sensor 15 delivers per unit of input optical energy. This generates approximately 2,353 MB/s of data. Frame rates of 30 fps are utilized which generates 1,176 MB/s of data, although 60 fps is possible. The mini-HDMI audio-video cable 140 is repurposed to provide eight serial channels using sixteen conductors 131. Using 8 channels, an effective communication speed of approximately 147 MHz at 30 fps is achieved using a standard LVDS, i.e. low-voltage differential signaling, serial communications protocol. Alternative embodiments employ HiSPi, Four-Lane MIPI, or other available serial communications protocols.

In a still further embodiment, the video sensor 18 is a module that may be removed and interchanged with other video sensors that sense light at different wavelengths and/or levels, e.g. non-visible wavelengths. In a preferred embodiment, a low light video sensor can be removably affixed within the camera module housing 70. In yet a further embodiment, an infrared sensor can be removably affixed within the camera module housing 70. In a still further embodiment, an ultraviolet sensor can be removably affixed within the camera housing 70. Moreover, the lens may also be interchanged to provide for different focal lengths, filters, or even a wide-angle lens.

To achieve optimal miniaturization of the camera 90, the audio-video cable 140 is hard wired directly to the PCB 10 by soldering conductors 131 to terminals on the PCB solder side 14. The audio-video cable conductors 131 are soldered directly to the PCB solder side 14, therefore the PCB 10 can be constructed substantially smaller than a PCB 10 having a conventional audio-video cable 140 connection using machine soldering methods, e.g. incorporating a standard male or female HDMI connector onto a flange on the side of the PCB 10 for the wire solder pads. As a result the camera 90 can be further miniaturized through the elimination of the standard male or female connectors on the PCB 10. Additionally, the absence of a bulky connector allows the for the arbitrary orientation of the audio-video cable 140 as it exits the camera module housing 70, providing flexibility in camera module housing 70 design.

After the audio-video cable 140 exits the camera module housing 70 through the audio-video cable port 68, the audio-visual cable 140 is retained by the cord guide 57. The cord guide 57 is preferably affixed to or integrated onto the camera module housing 70. The cord guide 57 secures the audio-video cable 140 to the camera module housing 70 so that the soldered connections 36 affixing the audio-video cable 140 to the PCB 10 will not be damaged and disconnected.

In an alternative embodiment, the CMOS video sensor 18 chip may compress the video into a compressed video file, preferably for temporary storage in flash memory prior to recording the data. Preferably the digital video is compressed into a standard format, e.g. mp4, avi, etc. . . . , and subsequently transmitted via an audio-video cable 140 to a media recorder 90. In a yet further preferred embodiment, the video is transmitted wirelessly by a transmitter 189 or transponder 189.

In a preferred embodiment, Bluetooth is used as a means of wireless communication. All modern mobile telephones are Bluetooth enabled and have that protocol factory installed, as do most personal electronic devices; therefore a Bluetooth based implementation provides a proven technology which would be economical and cost effective. Connections between Bluetooth enabled electronic devices allow these devices to communicate wirelessly through short-range, ad hoc networks known as piconets. Piconets may be established dynamically and automatically as Bluetooth enabled devices enter and leave radio proximity. Bluetooth technology operates in the unlicensed industrial, scientific and medical (ISM) band at 2.4 to 2.485 GHz, using a spread spectrum, frequency hopping with Gaussian frequency shift keying (GFSK), differential quadrature phase shift keying (DQPSK), or eight-phaseshift differential phase-shift keying (8DPSK) modulation. The basic data gross rate is 1 Mbit/s for GFSK, 2 MB/s for DQPSK, and 3 MB/s for 8DPSK.

The 2.4 GHz ISM band is available and unlicensed in most countries. Ideally, a Bluetooth transmitter used in the present system will be a class 1 radio, having a range of up to approximately 200 meters (roughly 984 feet). In a preferred embodiment, the range could be adjusted by optimizing the power to the associated Bluetooth transponder. The following table identifies the power scheme for each class of Bluetooth radio.

TABLE 1

| \multicolumn{3}{c}{BLUETOOTH POWER CLASSES} |||
| --- | --- | --- |
| Class | Maximum Power | Operating Range |
| 1 | 200 mW (20 dBm) | 200 meters |
| 2 | 2.5 mW (4 dBm) | 10 meters |
| 3 | 1 mW (0 dBm) | 1 meter |

Other wireless technologies are potentially beneficial as well. Various short range wireless technologies of interest are described in Table 2.

TABLE 2

SHORT RANGE WIRELESS TECHNOLOGIES

| Technology | Frequency | Range | Features |
|---|---|---|---|
| Bluetooth | 2.4 GHz | <200 m | Low-power |
| Cellular | Common cellular bands | Several km | Longer range |
| IEEE 802.22 | 470 to 768 MHz | Many miles | Longer range |
| UWB | 3.1 to 10.6 GHz | <10 m | Low power |
| Wi-Fi | 2.4 and 5 GHz | <200 m | High speed, ubiquity |
| Wireless HD | 7 GHz and 60 GHz | <10 m | Very high speed |
| Wireless USB | 2.4 GHz | <10 m | Proprietary protocol |

Table 3 summarizes Wireless HD for mobile and portable applications.

TABLE 3

WIRELESS HD FOR NON-STATIONARY DEVICES

| Device | Power | Antennas | Range |
|---|---|---|---|
| Mobile | <285 mW | 1-4 | 3-5 m, LOS/NLOS |
| Portable | <1 W | ~16 | 10, NLOS |

Table 4 summarizes Wireless HD applications and data transfer rates.

TABLE 3

WIRELESS HD APPLICATIONS

| Application | Data rate | Latency |
|---|---|---|
| Uncompressed QHD (2560x1440p, 59.954/60 Hz, 36 bit color) | 8.0 Gb/s | 2 ms |
| Uncompressed 720p frame sequential 3D A/V (1280x1440p, 59.94/60 Hz, 36 bit color) | 4.0 Gb/s | 2 ms |
| Uncompressed 1080p, 120 Hz (1920x1080p, 119.88/120 Hz, 30 bit color) | 7.5 Gb/s | 2 ms |
| Uncompressed 1080p A/V | 3.0 Gb/s | 2 ms |
| Uncompressed 1080i A/V | 1.5 Gb/s | 2 ms |
| Uncompressed 720p A/V | 1.4 Gb/s | 2 ms |
| Uncompressed 480p A/V | 0.5 Gb/s | 2 ms |
| Uncompressed 7.1 surround sound audio | 40 Mb/s | 2 ms |
| Compressed 1080p A/V4 | 20-40 Mb/s | 2 ms |
| Uncompressed 5.1 surround sound audio | 20 Mb/s | 2 ms |
| Compressed 5.1 surround sound audio | 1.5 Mb/s | 2 ms |
| File transfer | >1.0 Gb/s | N/A |

Serialized data from the video sensor 18 on the camera PCB 10 is transmitted to a remote video chip 153 for serial-to-parallel conversion and subsequent compression. The remote video chip 153 is housed on a DVR PCB 171, i.e. preferably a circuit board capable of supporting high speed serial communication lines, in the DVR housing 174. As previously stated, the DVR 200 can be located as much as 54 inches, i.e. 1.37 meters, from the camera 90 due to the serialization of the data. Having the remote video chip 153 compress the data remotely allows for a smaller camera 90 footprint. Conventional miniature cameras use parallel communications and require the video chip 15 responsible for compression to be located no more than 2-3 inches, i.e. 5-8 cm, from the photo-detector 16 on the PCB 10.

Figure 5:
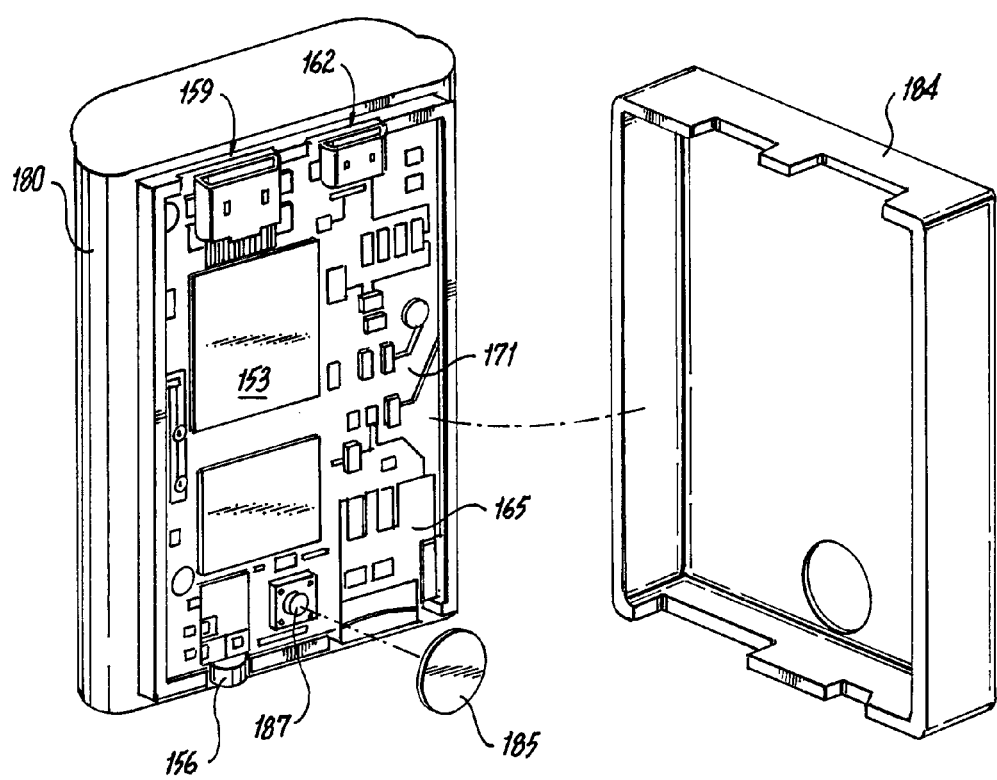
FIG. 5 depicts a perspective view of an embodiment of the mini-DVR with DVR casing removed.

After de-serialization of the data and subsequent compression, the data is stored onto computer readable media 97, e.g. micro-SD card, mini-SD card, SD-card, solid-state drive, etc. . . . , for wired transfer via a hardware communications port, e.g. micro-USB, or wireless transfer by a transmitter 189. In a preferred embodiment, high speed micro-SDHC or more preferably micro-SDXC format cards 97 having read/write rates of 25 MB/s or higher are used. In an alternative embodiment, an embedded SD card 97 may be used. Preferably, the computer readable media 97 is removable for physical transfer to another device for use. In a preferred embodiment, a female mini-HDMI connector 159 is integrated onto the DVR PCB to receive the repurposed HDMI audio-visual cable 140 and male mini-HDMI connector 157. A female micro-USB connector 162 is integrated into the DVR PCB for wired transfer of the data from the computer readable media 97. A removable computer readable media reader/writer 165, as depicted in FIG. 5, permits the user to removably insert a media card 167 into the DVR housing 174 and is connected to the DVR PCB 171 to receive the compressed video output from the compression video chip 92. A microphone jack 156, preferably a 2.5 mm audio jack 156, is integrated into the DVR housing 174 and connected to integrated circuitry on the DVR PCB 171 to format and compress audio data from an external microphone 137 and transfer it to the computer readable media 97. The mini-DVR further possesses a power button 185 to actuate a power switch 187.

Figure 3:
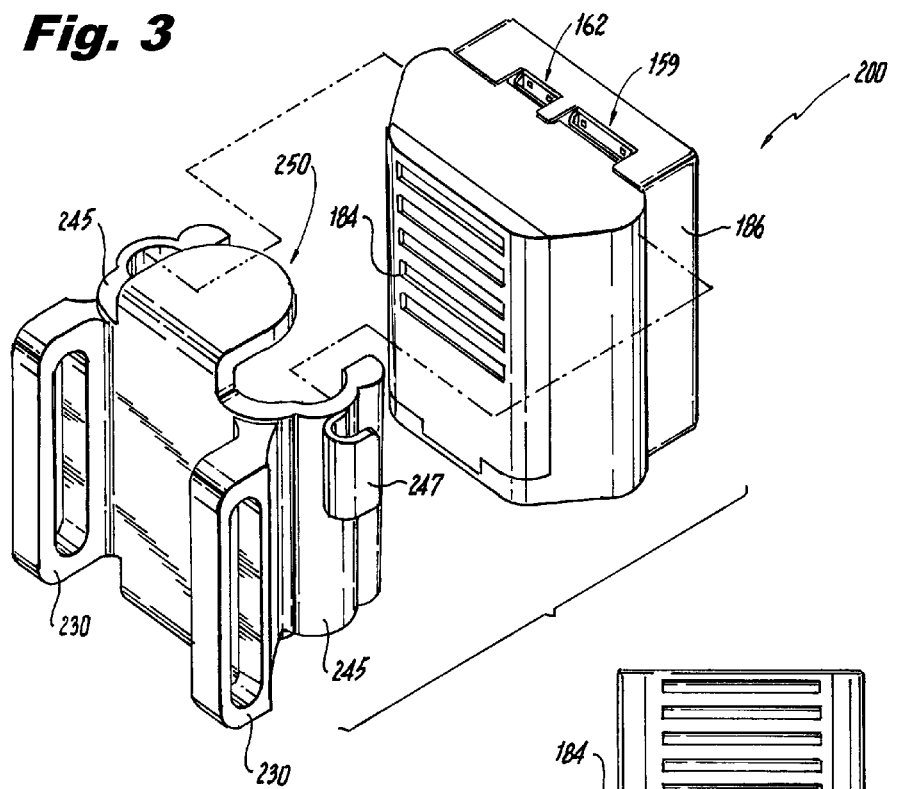
FIG. 3 depicts an perspective exploded view of the mini-DVR and DVR harness.
Figure 4:
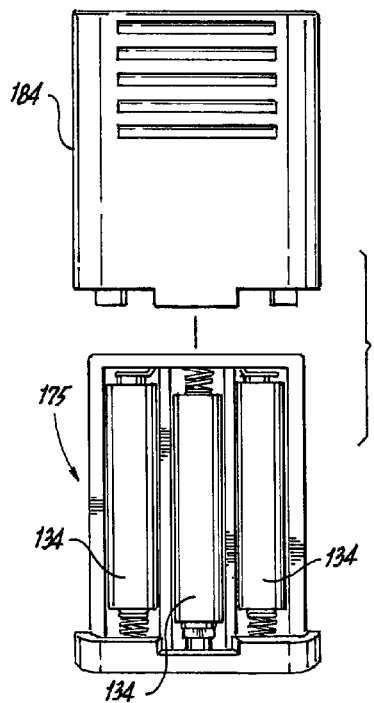
FIG. 4 depicts a perspective exploded view of an embodiment of the subject mini-DVR battery compartment and battery panel.

As depicted in FIGS. 3-5, the DVR housing 174 is preferably a multi-part assembly of at least two parts, the DVR casing 180 and the DVR cover 186. The DVR PCB 171, and connectors 159, 162 reside in the DVR casing 180 and are powered by a direct current power source 134, i.e. batteries 134, stored between the DVR PCB 171 and the DVR casing interior surface 177. The batteries 134 may be accessed through a removably attached battery access panel 184 on the DVR casing exterior surface 183.

The DVR housing 174 is preferably removably attached to the wearer of the miniature camera 90 by a wearable DVR harness 250. The harness 250 may be affixed wherever it may be conveniently worn. In a preferred embodiment, the harness 250 receives the DVR housing 174 which it secures in a snap-fit arrangement with the tensioned harness arms 245 sliding about the DVR housing 174 to retain the DVR 200 in a friction fit arrangement. In a still further preferred embodiment, the harness 250 possesses strap ports 230 to receive a fixed or adjustable strap 220 or may receive the belt of the wearer. In a further embodiment, the harness 250 is equipped with a harness mount 240, e.g. tensioned harness clip 240 which permits it to be slid onto an object and retained in a friction-fit arrangement. The DVR housing 174 further possesses a microphone clip 247.

Figure 13:
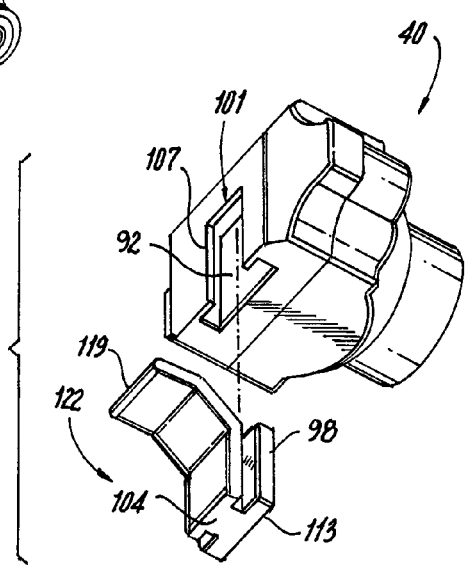
FIG. 13 depicts a perspective view of an embodiment of a key-keyway camera mount.

In an additional embodiment, as depicted in FIG. 13, the distal camera module casing 40 detachably mates with a camera mount 130. In a preferred embodiment, the camera housing 50 and camera mount 130 mate in a key-keyway arrangement. In a further preferred embodiment, the distal camera module casing 40 possesses a slotted keyway 92 that is integrated with the camera module housing 70 that is oriented substantially perpendicularly to the camera mount face 116 and parallel to axis along the length of the lens housing 35 of the camera 90. The key 98 is substantially parallel to the camera mount face 116 and connected by a key support arm 104.

The keyway 92 is configured to descend onto they key 98 so that the exterior surface of the distal camera module casing 40 is substantially parallel with the key 98 and the camera mount face 116. The keyway 92 possesses a key support arm channel 107 in the distal keyway wall 95 to permit the key 98 to traverse the keyway 92 without being hindered by the keyway 92 until the key support arm channel 107 terminates at the key stop 101. The key support arm channel 107 acts to help guide the key 98 through the keyway 92 and secures its orientation so as to inhibit rotation. In a still further preferred embodiment, the key 98 is secured in the keyway 92 by a tensioned key stop tab 110 that is displaced by the key 98 as it enters the keyway 92 and reengages once the key bottom 113 of the key 98 passes the tensioned key stop tab 110 passes by and is no longer displaced. Removal of the key 98 must first be initiated by depressing the tensioned key stop tab 110 to permit the key 98 to slide over it and down the keyway 92. In a further embodiment, they key 98 is T-shaped when viewed along its vertical axis, with the key support arm 104 forming the figurative downward stem of the letter T and the keyway 92 designed to receive and restrain the crossbar of the letter "T" as the key 98 while possessing a key arm support channel 107 to permit the support arm to pass through the distal keyway wall 95.

Figure 11:
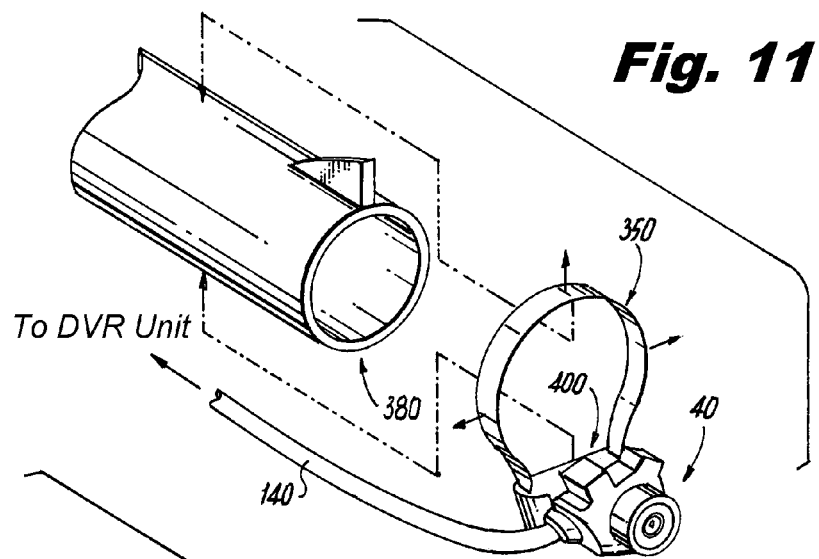
FIG. 11 depicts a perspective partial view of an embodiment of the single gun barrel mount having an adjustable band.

In a further embodiment, as depicted in FIGS. 10 and 11, the camera mount 130 is progressively angled to from the support mount 119 to the key mount 122. The support mount 3 is affixed to an object for the purpose of supporting the camera 90. At the opposite end of the camera mount 130 from the support mount, the key mount 122 is either in a fixed angular relationship with the support mount 173 or in an adjustable angular relationship. In a still further embodiment, the angular relationship between the support mount 119 and the key mount 122 is modified by movement along an adjustable mount hinge 125.

Applications

Televised horse racing is a growing industry in the United States, spurred by progress in HD television broadcasting and the virtually complete replacement of traditional antenna-to-antenna signal broadcasting with satellite and digital cable transmissions. One popular trend in the industry is wagering on random rebroadcasts of old races. Previous industry attempts at capturing video from the jockey's perspective met with significant failure due not only to camera size and video quality, but also with limitations created by dirt adhering to the camera lens mid-race. Jockeys traditionally wear multiple sets of nested goggles 285 and shed them during the race as their vision becomes obscured from dirt kicked up by surrounding horses. Since the course is typically damp from being sprayed with water to inhibit dust formation, the dirt tends to adhere to the surface of the goggles 285 and can obscure the jockey's vision and the lens 60 of any camera worn in the race by the jockey. Moreover, some constituents in new synthetic racing surfaces are susceptible to clumping as they contain significant fibrous material and/or have constituents which can carry a static electricity charge. It would be ideal to record or broadcast a horse race from the perspective of the jockey using a camera 90 on a goggle mount 300.

In a preferred embodiment, as depicted in FIG. 8-10, a video camera 90 is mounted onto jockey goggles 285 to record or broadcast the event. In the present embodiment, the innermost set of goggles 285 is equipped with a miniature camera 90 mounted on the nose bridge 263 of the goggles 285, between the eyes of the wearer. The goggles 285 nested outside of the inner pair of goggles 285 each possess a transparent lens shield 272. The lens shields 272 are arranged so that the adjacent underlying lens shield 272 is protected by the adjacent outer lens shield 272. Preferably each lens shields' 272 is constructed from the same material as the goggles' lens 275. Common materials are polycarbonate, mid index plastic and similar transparent materials. As one set of goggles 285 or its lens shield 272 becomes occluded, the jockey removes it mid-race down around the neck in order to expose an underlying clean set of goggles 285 with a clean lens shield 272.

The lens shield 272 can be an extension of the goggle lens 275 or it can be affixed to the nose bridge 263 on the goggles 285. The goggle lens 275 and lens shield 272 have a consistent thickness to prevent distortion. The substantially transparent material for the lens shield 272 and goggle lens 275 is chosen based on the desired refractive index, light absorption, and light dispersion, i.e. light scattering, properties. Additionally, a lens shield 272 and goggle lens 275 should possess no manufacturing defects which could affect the wearer's vision or blur the image recorded by the camera 90.

The material for the lens shield 272 is determined in part based on the Abbe number. The Abbe number is used to describe the dispersion properties of the lens 60 in relation its refractive index and is the ratio of the angle of deflection to the mean dispersion angle. A high Abbe number indicates a low level of dispersion. A higher index of refraction means a denser material and therefore a thinner lens. In one embodiment, the chosen lens material has inherent flexibility. In yet another embodiment, the chosen lens material is rigid. Table 1 provides examples of the optical properties of common lens materials.

TABLE 1

OPTICAL PROPERTIES OF LENS MATERIALS

| Material | Refractive Index | Abbe Value |
| --- | --- | --- |
| Crown Glass | 1.52 | 59 |
| High Index Glass | 1.60 | 42 |
| High Index Glass | 1.70 | 39 |
| Plastic CR-39 | 1.49 | 58 |
| Mid Index Plastic | 1.54 | 47 |
| Mid Index Plastic | 1.56 | 36 |
| High Index Plastic | 1.60 | 36 |
| High Index Plastic | 1.66 | 32 |
| Trivex | 1.53 | 43 |
| Polycarbonate | 1.58 | 30 |
| Perspex | 1.49 | 54 |
| Acetate | 1.47 | 55 |
| Polyacrylate | 1.49 | 63 |
| Polystyrene | 1.59 | 29 |
| Styrene | 1.51 | 43 |

In an alternative embodiment, a plurality of removable lens shields 272 are affixed to the nose bridge 263 of a single pair of goggles 285. Each lens shield 272 possesses a means for pulling 274 or peeling an individual lens shield 272 away from the goggles 285. Such pulling means 274 includes tabs and similar extensions spatially arranged to permit the wearer to differentiate between the stacked lens shields 272 and which permit the wearer to grasp and individually remove the outermost lens shield 272. An adhesive is applied between the individual lens shields 272 in an area that won't be in front of the lens 60 so as to adhere each lens shield 272 to an adjacent lens shield 272 until physically removed by the wearer.

The audio-video cable 140 is affixed to and runs along the top rim 255 of the goggles 285. A mini-DVR 200 is remotely worn by the user for data storage. A microphone 137 is also worn by the user to capture audio to record with the video data. In an alternate embodiment, the video and audio data feed from the camera 90 is sent to a portable transmitter 189 worn by the wearer for broadcast. In a preferred embodiment, the data is transmitted by Wi-Fi or cellular 3G or 4G technology. In a further preferred embodiment, Wireless HD is used to transmit data by a wireless transmitter 189.

Figure 14:
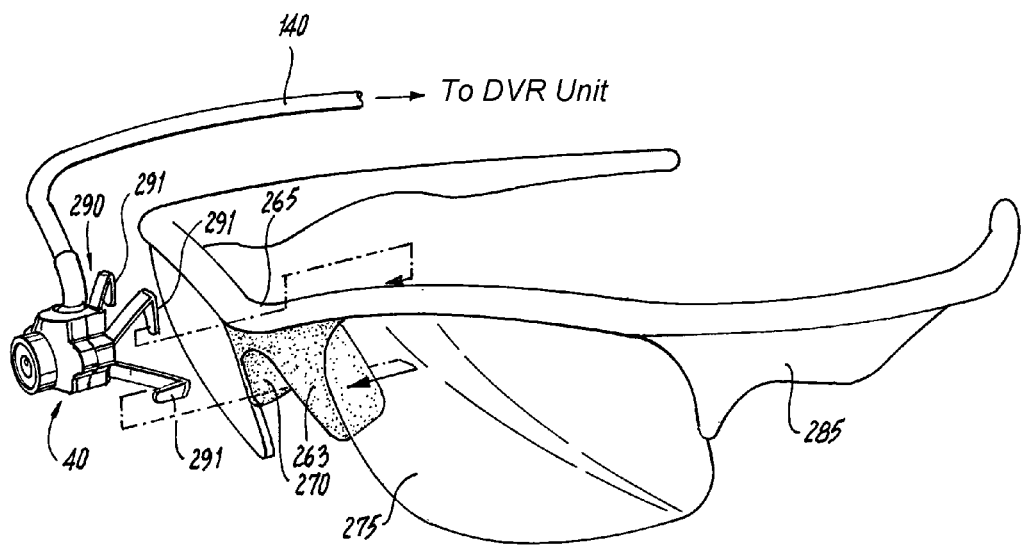
FIG. 14 depicts perspective view an embodiment of a dismounted camera mount for eyewear.

A preferred embodiment, as depicted in FIG. 14, incorporates a camera mount 130 designed to affix to the nose bridge 263 of a pair of glasses 285 or safety goggles 285. The camera mount 130 would mount in front of the nose bridge 263 by using at least one arm to hook over the top of the bridge 265 while the bottom of the bridge 263 would possess at least one arm which would engage the rear of the bridge 263 by passing below the base of the bridge 270 to engage the rear surface of the bridge 260 or lenses 260. The mount 130 uses the bridge 263 as a fulcrum about which the mount 130 is affixed by first engaging the top 265 or base 270 of the bridge 263 and then applying pressure about the bridge 263 to engage the remaining arm(s) of the mount 130. The converse construction of the mount 130 is also workable with the mount passing between the bridge 263 and the wearer while engaging the outer surface of the bridge 263 and/or lenses.

As depicted in FIGS. 7, 7a, and 7b, additional embodiments may use camera mounts 130 in a variety of military and sporting helmets, e.g. football, hockey, lacrosse, and baseball helmets where the camera 90 is recessed and mounted within the protective confines of the helmet 580 but preferably outside of the wearer's field of vision, e.g. adjacent to the forehead. In a further alternative embodiment, a helmet 580 outfitted with a camera 90 would utilize a DVR 200 housed within the helmet 580 or affixed thereto. Preferably the DVR 200 would be housed within the back of the helmet 580 to minimize damage from impact. The DVR 200 may be secured within a DVR storage compartment 586 within the helmet 580. Ideally, the inclusion of the DVR 200 is accomplished without a reduction in the thickness of any padding within the helmet 580. Alternatively, a mobile transmitter 189 could be integrated into the helmet 580, e.g. in the DVR storage compartment 586, using the DVR 200 to buffer the data feed or compress it prior to transmission. This data would prove useful in evaluating conditions or performance for military and rescue personnel as well as providing feedback on athlete timing, attentiveness and readiness. A plurality of cameras 90 could be employed to gauge team timing, effectiveness and communication.

When the camera 90 is mounted in a helmet 580, vibration and shock resistance are important thus the helmet mount 600 is anticipated to be configured with vibration dampening or deflecting materials and/or structures. The helmet mount 600 is preferably affixed to the front of the helmet 580 and possesses a mounting flange 571, preferably mounted between the helmet padding 574 and the helmet inner surface 573. The helmet mount 580 is ideally recessed under the brim 575 of the helmet 580 at the forehead to keep it out of the visual field of the wearer. A preferred embodiment of a helmet mount 600 incorporates reinforcement ribs 570 and arcuate support arms 572 with the apex of the curve of each support arm 572 extending laterally relative to the mount's proximal-distal axis. The reinforcement ribs 570 and support arms 572 act to absorb vibration between the helmet mount 600 and the camera 90. The helmet mount 600 possesses mount fastener holes 584 which align with existing fastener holes 590 in the helmet 580 so as to not affect the structural strength of the helmet 580 and permit the mount flange 592 to be mounted to the helmet 580 using fasteners 595, e.g. snaps, rivet, and bolts.

The support arms 572 fix the camera mount in place relative to the helmet 580 and permit the helmet mount 600 to move proximally relative to the helmet 580 as the helmet 580 is pressed against the forehead. The support arms 572 also provide torsional flexibility, allowing the camera 90 to move and deflect laterally as well providing limited rotation if an outside object gets inside the facemask 582 and impacts the helmet mount 600, thus minimizing breakage and extending the life of the helmet mount 600. In a preferred embodiment, the helmet mount 600 make use of rounded edges to minimize the likelihood that an outside object will catch on the camera 90 or support arms 572.

The mount flange 571 ideally possesses at least one and preferably two flange fastener holes 584 aligned with the helmet fastener holes 590 in the front of the helmet 580. The flange fastener holes 584 are preferably slotted so as to permit the mount flange 571 to be secured to multiple helmet designs. The mount flange 571 may be held in place with a fastener 595. A flexible, positionable helmet mount 600 is preferred. The helmet flange 571 is preferably molded from a deformable material such as a thermoplastic, e.g. acrylonitrile butadiene styrene (ABS).

Figure 12:
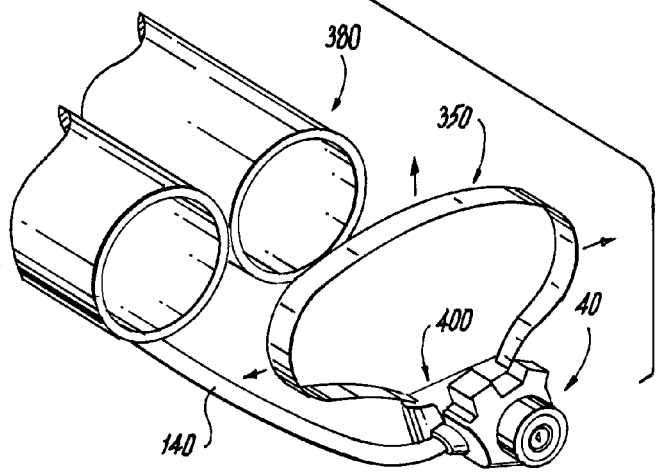
FIG. 12 depicts a perspective partial view of an embodiment of the double gun barrel mount having an adjustable band.

In yet another embodiment depicted in FIGS. 11-12, a camera 90 is coupled with a gun barrel mount 400 which is affixed to a gun barrel 380 by an adjustable barrel band 350. Ideally a gun barrel camera mount 400 would have vibration dampening properties. In alternative embodiments, the adjustable band 350 may be elastic band, a ring clamp, or a strap. This embodiment is anticipated to aid in target acquisition and shooting mechanics for hunters, police, soldiers, and sharpshooters.

Figure 15:
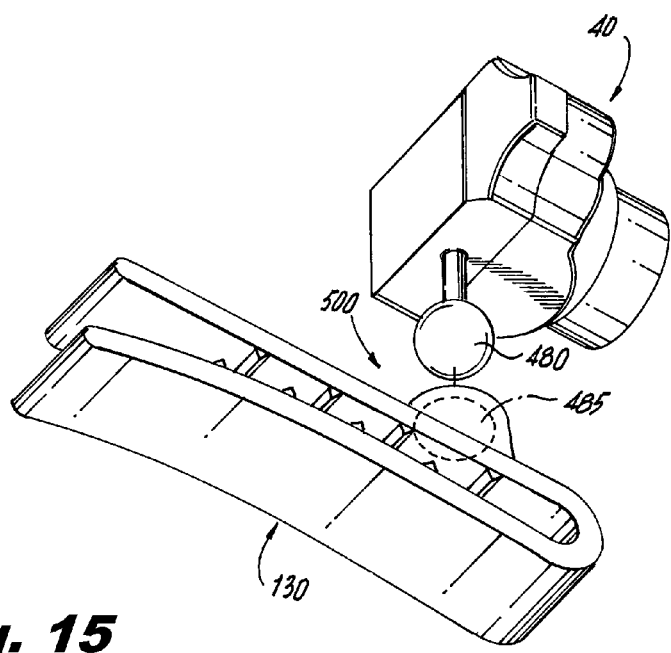
FIG. 15 depicts an embodiment of a disassembled camera mount clip having a ball and socket joint.

An additional camera mount 130 embodiment incorporates a ball and socket joint mount 500, as depicted in FIG. 15, to permit the camera 90 to be rotated into a desired position. Ideally, the ball and socket joint 490 is possesses sufficient friction across the joint 490 to permit the ball 480 and socket 485 to maintain their relative positions.

In a further embodiment, as depicted in FIG. 16, a camera mount 130 further comprises a means to attach the mount 130 to the bridge 263 of a pair of glasses or goggles 285. In a preferred embodiment, at least one bridge clip 286 extends from the top of the camera module housing 70 to permit the bridge mount 290 to be removably mounted. Preferably, the bridge clip 286 is formed as an upwardly extending arm 591 progressing from the bridge clip 286 origin at the top of the camera module housing 70, cresting at a distally oriented bend, and progressing down and forward toward the nose bridge to form a terminal point that creates an inverted u-shape.

The integrated data and power cable is preferably passed along the top of the glasses 285 or goggles 285, outside of the vision of the wearer. The cable may be integrated into the glasses 285 or goggles 285 or may be affixed by attachment means, e.g. clips, glue, or similar means of attachment. The clips 258 channel the cable along or impinge the cable to the frame of the glasses or goggles 285. The clips 258 are affixed to the frame of the glasses 285 or goggles 285 either by clipping using at least one tensioned arm 291 to create a friction fit arrangement or may be securely attached to the frame by common means of attachment, e.g. adhesives, screws, hook or loop fabric, and bands which pass through the clip and around the frame. Ideally, the integrated data and power cable 140 will pass around the head of the wearer via a helmet or head gear and down the back to a power supply and data recording media assembly 250 and/or buffer. Within a jockey's helmet 280, the audio-visual cable 140 can be installed so as to pass beneath the padding 282. The audio-visual cable 140 is run to a data recorder 250 affixed to the helmet 280 or worn by the jockey. Alternatively, the data can be wirelessly transmitted from a wireless transmitter 189, e.g. transponder 189, to a remote receiver 192. In a still further embodiment, a wired 137 or wireless microphone 195 can be incorporated for the capture of sound along with video or pictures.

In a preferred embodiment, cable clips 258 attach the audio-visual cable 140 to the top rim of the goggles 255. The cable clips 258 are affixed so as to provide customized guidance of the audio-visual cable 140.

What is claimed is:

1. A miniature camera system comprising:
   (a) a camera module which converts light into uncompressed video in the form of serial data, said camera module comprised of at least one lens arranged to direct light onto a photo-detector of a video sensor affixed to a printed circuit board, and camera module integrated circuitry which converts uncompressed video in the form of parallel data to said uncompressed video in the form of serial data, said camera module integrated circuitry acting to cause synchronous transmission of said uncompressed video in the form of serial data over a plurality of data channels, said video sensor selected from the group consisting of video sensors which detect wavelengths in the visible, infrared, and ultraviolet spectrums;
   (b) an digital data recording device having recorder integrated circuitry to receive said uncompressed video in the form of serial data and recombine said uncompressed video in the form of serial data back to said uncompressed video in the form of parallel data; and
   (c) at least one data cable for the synchronous transmission of uncompressed video in the form of serial data to said data recording device, said at least one data cable having a plurality of paired wires capable of transmitting more than six channels of data and wherein via a plurality of conducting wires affixed to component terminals on said printed circuit board of said camera module wherein each said conductor is arranged to received and communicate a single channel of uncompressed serial data from said camera module integrated circuitry from said camera module.

2. The miniature camera system of claim 1, wherein said video sensor which detects light in the visible spectrum is further optimized for night vision.

3. The miniature camera system of claim 1, wherein recorder integrated circuitry acts to compress said uncompressed video in the form of parallel data and store said compressed video in the form of parallel data on computer readable media.

4. The miniature camera system of claim 3, wherein said digital data recorder possesses an card writer that stores data on memory cards selected from the group consisting of high speed micro-SDHC and micro-SDXC cards.

5. The miniature camera system of claim 3, further comprising a microphone.

6. The miniature camera system of claim 5, wherein said digital data recorder receives data from said microphone via a female audio jack that receives a male connector of said microphone.

7. The miniature camera system of claim 3, further comprising a data recording device harness to retain said data recording device, wherein said harness may be removably affixed to a person or object.

8. The miniature camera system of claim 7, wherein said harness receives said data recording device in a tensioned snap-fit arrangement.

9. The miniature camera system of claim 3, further comprising an audio-visual data transmitting device, said digital data transmitting device arranged to receive said uncompressed video in the form of parallel data from said recorder integrated circuitry, and a wireless transmitter to broadcast said compressed video in the form of parallel data.

10. The miniature camera system of claim 9, wherein said wireless transmitter utilizes a communications protocol selected from the group consisting of Bluetooth, Wireless HD, Cellular, IEEE 802.22, Wi-Fi, and UWB.

11. The miniature camera system of claim 1, wherein said data cable is a mini-HDMI audio-visual cable connected to said printed circuit board in said camera by soldering wire conductors directly to component terminals.

12. The miniature camera system of claim 11, wherein said digital data recording device possesses a female mini-HDMI connector to receive said HDMI audio-visual cable.

13. The miniature camera system of claim 11, wherein said digital data recording device possesses a female micro-USB connector for direct data transfer.

14. The miniature camera system of claim 1, further comprising a camera housing joined to a camera mount by a ball and socket joint.

15. The miniature camera system of claim 1, further comprising a camera housing affixed to a camera mount having at least one top mounting arm to extend over a nose bridge of an eyewear frame and at least one bottom mounting arm to extend beneath said nose bridge of said eyewear frame wherein said top and said bottom mounting arms are tensioned so as to secure said camera housing to said nose bridge when affixed to said eyewear.

16. The miniature camera system of claim 15, wherein said data cable is secured to an upper rim on said eyewear by at least one cord clip.

17. The miniature camera system of claim 1, wherein the video sensor is selected from the group of video sensors optimized for infrared, ultraviolet, and human visible wavelengths.

18. The miniature camera system of claim 1, wherein the video sensor is a low light video sensor.

19. The miniature camera system of claim 1, wherein the lens is removably affixed and interchangeable with lenses having different focal lengths.

20. The miniature camera system of claim 1, wherein the lens is removably affixed and interchangeable with a lens having a different focal lengths.

21. The miniature camera system of claim 1, wherein the lens is removably affixed and interchangeable with a lens having a filter.

22. The miniature camera system of claim 1, wherein the lens is removably affixed and interchangeable with a wide-angle lens.

* * * * *